US011974189B2

(12) United States Patent
Sullivan et al.

(10) Patent No.: US 11,974,189 B2
(45) Date of Patent: Apr. 30, 2024

(54) SYSTEM AND METHOD FOR FACILITATING COMMUNICATION BETWEEN ATTORNEYS PRESENT IN A COURT GEOGRAPHICAL LOCATION

(71) Applicant: Mobile Court Solutions, Inc., Port Jefferson, NY (US)

(72) Inventors: Richard Joseph Sullivan, Port Jefferson, NY (US); Ashish Verma, Saint James, NY (US)

( * ) Notice: Subject to any disclaimer, the term of this patent is extended or adjusted under 35 U.S.C. 154(b) by 350 days.

(21) Appl. No.: 17/668,696

(22) Filed: Feb. 10, 2022

(65) Prior Publication Data

US 2023/0254662 A1 Aug. 10, 2023

(51) Int. Cl.
*H04W 4/021* (2018.01)
*G06Q 50/18* (2012.01)
*H04M 1/72469* (2021.01)
*H04M 3/56* (2006.01)
*H04W 60/04* (2009.01)

(52) U.S. Cl.
CPC ............ *H04W 4/022* (2013.01); *G06Q 50/18* (2013.01); *H04M 1/72469* (2021.01); *H04M 3/565* (2013.01); *H04W 60/04* (2013.01)

(58) Field of Classification Search
CPC . H04W 4/022; H04W 60/04; H04M 1/72412; H04M 1/72469; H04M 1/72403; H04M 3/565; H04M 7/0027; G06Q 50/18
USPC .......................................................... 455/416
See application file for complete search history.

(56) References Cited

U.S. PATENT DOCUMENTS

| 7,418,268 | B1* | 8/2008 | Cabano ................... H04L 67/04 455/518 |
| 9,036,807 | B1 | 5/2015 | Tuchman et al. |
| 9,264,462 | B2 | 2/2016 | Heiferman et al. |
| 9,503,533 | B2 | 11/2016 | Altman et al. |
| 10,045,154 | B2 | 8/2018 | Venkatraman et al. |

(Continued)

OTHER PUBLICATIONS

Sandbulte, Jomara, et al.; Community Animation: Exploring a Design Space that Leverages Geosocial Networking to Increase Community Engagement, Feb. 7, 2019.

(Continued)

*Primary Examiner* — Maria El-Zoobi
(74) *Attorney, Agent, or Firm* — Alan M. Sack; John F. Vodopia; SACK IP Law p.c.

(57) ABSTRACT

A computer-implemented method enables registered mobile device users associated with a common matter to identify each other in a court-complex setting, and to communicate with each other directly using mobile devices once the registered mobile device users enter a code associated to the common matter. A server-side application receives and processes user and/or firm names to effect registration. Using the mobile device application, a first registered mobile device user enters a code associated with the common matter, received by the server-side application that receives and processes the code, effecting check in by the first registered mobile device user. Using the mobile application, a second registered user enters the code associated with the common matter, enabling the first and second registered mobile device user associated with the common matter to communicate over a wireless network using Voice over Internet Protocol (VoIP), Wi-Fi and/or cellular telephony.

27 Claims, 18 Drawing Sheets

(56) References Cited

U.S. PATENT DOCUMENTS

| | | |
|---|---|---|
| 10,891,682 B2 | 1/2021 | Swanson |
| 2015/0067044 A1* | 3/2015 | Bakaev ............... H04L 65/1059 |
| | | 709/204 |
| 2015/0248651 A1 | 9/2015 | Akutagawa et al. |
| 2016/0135014 A1* | 5/2016 | Alharayeri ............ H04L 67/306 |
| | | 455/456.3 |
| 2018/0027381 A1 | 1/2018 | Kamino et al. |
| 2018/0216946 A1 | 8/2018 | Gueye |
| 2020/0028922 A1* | 1/2020 | Bravo Avina ........... H04L 67/52 |
| 2020/0068362 A1 | 2/2020 | Nordstrom et al. |
| 2020/0084575 A1 | 3/2020 | Brown et al. |
| 2020/0175612 A1* | 6/2020 | Montoya ............... H04L 67/306 |
| 2020/0374668 A1 | 11/2020 | Kime et al. |
| 2023/0188966 A1* | 6/2023 | Gaver .................. H04L 65/403 |
| | | 709/204 |

OTHER PUBLICATIONS

Liu, Zilong, et al., Run for the Group: The Influences of Group Level Social Comparisons and Offline Meetups in Fitness Users' Exercise Participation, Mar. 21, 2021.

* cited by examiner

Cases Ready for Conference

Order of Conferences

| Calendar # | Case Index | Case Name | Nickname | Join |
|---|---|---|---|---|
| 19 | 345621/ 19 | Wells Fargo v. Michael Jones | Conference In Progress | |
| 6 | 345621/ 20 | Wells Fargo v. Marco Botton | Next For Conference | |
| 14 | 345621/ 21 | Bank of NY v. Valerie Cook | 2$^{nd}$ in line for conference | |
| 1 | 345621/ 18 | Wells Fargo v. Lawrence | 3$^{rd}$ in line for conference | |
| 5 | 426730/19 | Citibank v. Machalachen | 4$^{th}$ in line for conference | |
| 11 | 508963/21 | SLS Services v. Paluccio | 5$^{th}$ in line for conference | |
| 17 | 898715/16 | Thompson v. Aken | 6$^{th}$ in line for conference | |

Home   Settings   Subscription   Back to Check-In Page

FIG. 5G

SYSTEM AND METHOD FOR FACILITATING COMMUNICATION BETWEEN ATTORNEYS PRESENT IN A COURT GEOGRAPHICAL LOCATION

COPYRIGHT

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Field of the Invention

The invention relates to a system and method that enable users (i.e., user mobile devices) to identify, find, and communicate with others working on or interested in a common matter for a limited time sufficient to connect all interested users to achieve the purpose of their common interest, without the users knowing in advance the identity of the other interested users or the other interested users' phone numbers. The inventive system and method connect users through a number previously known to all users and assigned to a common matter for clerical or identification purposes, such as lawyers at a court complex connecting through a case index number, where the case is the common matter of common interest.

Additionally, the inventive system and method include a feature whereby court personnel, at a court complex, may use the invention with a computer or mobile device to have attorneys check-in remotely and to conference a scheduled case remotely without the court personnel knowing in advance the identities of the attorney users, preferably including the attorney phone numbers, by connecting all attorney users through the case index number; and to better manage scheduled cases by allowing the court user to determine when each scheduled case will be conferenced, preferably while also providing attorney users with sufficient notice of the time for their conference to allow the attorney users to utilize their time more productively while waiting for their conference to be heard.

In a preferred embodiment for the "find me at court" function, the inventive system and method allows one attorney to detect and communicate with another attorney's mobile device, such as a smartphone, tablet, laptop or any known communicable electronic device, when proximate a specific geographic location, such as a courtroom, when the attorney (and mobile device) enters a "system waiting area" (see below), opens the mobile device application and enters a case index number identical to the case index number entered by another attorney who has opened his mobile device application and is present in the "system waiting area." Preferably, presence in a system waiting area enables users who have registered via an API operating at an application server to be identified to each other (for example, with a "ping" sound), and to communicate with each other directly using their mobile devices in reliance upon voice over Internet protocol (VoIP).

Background of the Related Art

Systems and methods for enabling persons with mobile devices in a same geographical area to communicate and locate each other are known, particularly for social networking applications. For example, U.S. Published Application No. 2020/0068362 to Nordstrom, et al. (Nordstrom) discloses a collaboration server/system 26 that assists mobile device users to detect friends/interesting people in a flexible and private manner. Nordstrom's collaboration system and method enable a roaming device to automatically scan a surrounding area for other mobile devices that meet a predetermined search criteria established by the roaming mobile device user (same vicinity). The criteria are any of: common interest, attribute, status and profile. Then, the collaboration system/server presents a list of names or identifiers of the other mobile devices uncovered by the scan. If the discovered mobile device is selected from the roaming mobile device's list, and the roaming mobile device user is selected from the discovered device's list, then the identity, location, status and/or other personal information of each of the two parties are revealed to each other and a communication can be established. [0023]; FIG. 2.

Nordstrom requires a "collaborative system" meaning an information system used to facilitate efficient sharing of data, documents, files, information and knowledge. For example, Nordstrom uses search criteria predetermined by the mobile user to connect with other users. Nordstrom also provides for a map to display users' locations. The invention requires no such display. It facilitates the identification of other user's locations by identifying another user through noise and visual recognition.

Nordstrom does not utilize information, such as an identical index number, confirmation number, a list of cases (without limitation). Nordstrom does not identify mobile device users entering an area (e.g., geo fence) based on proximity data associated with the respective mobile devices, nor a code that must be sent to the server app, pursuant to common interest such as a litigation file number or other court docket number.

The inventive system and method do not require user involvement, or profile data and uses location data only incidentally to avoid inadvertent contact with more remote users who may, by chance, enter the same index or confirmation number, but location data is not required to have the users identify and contact one another. The invention's use of location data merely enhances the user's experience by focusing on the primary purpose of the invention, which is to identify and communicate with another user who is in close physical proximity. Applicant's inventive system and method facilitates the identification of other user's locations by identifying another user through noise and visual recognition.

U.S. Pat. No. 9,036,807 to Tuchman et al. ("Tuchman") discloses a "live connect system" that coordinates with content providers and content distribution systems to provide and distribute live content (live connect content) to end users as visitors. With the live connect system, an end user (e.g., visitor) who accesses live content can establish a live communication session with another user (e.g., support agent, specialist) that is associated with the live content at the point in time, for example, for the purpose of discussing further detailed information concerning the content presented. The live content presented to the visitor includes information indicating that there is a support agent who is available at the point in time to have a live conversation with the visitor. The live content also includes information indicating a geographic location of that support agent with respect to the geographic location of the visitor (e.g., within a predetermined geographic proximity). As a result, the end user does not have to go through tedious manual operations in order to reach out someone who is nearby and familiar with the content in question or someone who he or she can talk to immediately concerning the content. (col. 3, lines 27-47) In one embodiment, an available specialist may be someone located within a predetermined geographic proximity with respect to a geographic location associated with the visitor. (col 4, lines 5-32).

U.S. Published Application No. 2020 0374668 to Kime et al. ("Kime") discloses a computing system including a plurality of computing devices associated with a plurality of users where each computing device of the plurality of computing devices is configured to: electronically receive software which, when executed, cause the computing device to display a plurality of instances of a specifically programmed graphical user interface (GUI). Each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes. The Kime system relies on at least one unique secret key to authenticate the presence of other user devices, in addition to proximity [0031-0032] The secret identifier may take the form of a keyword, phrase or image, such a color.

U.S. Published Application No. 2020 0175612 to Montoya et al. ("Montoya") discloses a system/method that provides for matching a first user in a first geographic location with a second user in a second geographic location and enabling the first user to find the second user in the second geographic location. The first geographic location can be the same as the second geographic location, where the matching is based on user-specific matching criteria, including a first user profile of the first user and a second user profile of the second user. The first user can communicate with the second user, which might be a business posting advertisements, and coupons, such as location-based coupons. (pars. 0026; 0067)

U.S. Published Application No. 2018 0027381 to Kamino et al. ("Kamino") discloses an information processing apparatus, a control method, and a program, that are said to allow for reducing a psychological barrier in using a position information sharing system by sharing position information in accordance with a gathering of users, and also promoting communication with another user, whereby a set sharer is notified of place information based on the pieces of current position information of the plurality of users. (pars. 0027-0029; FIG. 1). A sharer setting unit 10c narrows down "friends" to be set as a sharer among the users having the above-mentioned relationship or the users who have common characteristics in accordance with a gathering place and a gathering time slot. Any one piece of position information, or multiple pieces of position information among the respective pieces of position information of the users may be used. Notification of the position information of the gathering place can be issued by, for example, transmitting a map image indicating the relevant position to the user terminal 2 c of the sharer user C. In addition to the position information of the gathering place, a message that promotes gathering, e.g., "we're drinking near you, do you want to join us?" together with the map image indicating the relevant position. (pars. 0043-0045) Applicants' inventive system and method, however, do not use a position information sharing system, or sub-system, and relies upon location data only incidentally.

U.S. Published Application No. 2020 0084575 to Brown et al. ("Brown") discloses a system and method that allows separate parties to identify each other through the use of matching computer-coordinated identifiers, i.e., identify a first computer device configured to provide a first perceptible identifier, using the processor to identify a second computer device that is configured to provide a second perceptible identifier, and using the processor to send the first perceptible identifier to the first computer device and the second perceptible identifier to the second computer device. The first and second perceptible identifiers correspond with each other to provide a two-sided, computer-coordinated verification. The identifiers can be used in place of a ticket (e.g., for entry to a movie, concert, game, play, meeting, meal, and/or other event). In some such implementations, the identifier (or ticket) assigned to a first computer device can be reassigned from the first computer device to any other suitable number of computer devices, such that the identifier (or ticket) could be "passed on." (pars. 0028-0030) Applicants' inventive system and method, however, do not rely upon computer coded verification to replace a ticket, and readily distinguishable from Brown.

SUMMARY OF THE INVENTION

The invention provides a system and method that enable mobile device users operating a client-side application on their mobile device browser and who have registered with a server-side application ("server" or "server-side app"), to "find" other mobile device users that may be registered on a common matter. The registered mobile device users, for example, might be lawyers in a litigation in possession of a particular code assigned to the case, such as an index number, or court docket number. The mobile device users who have already entered an assigned location, such as a courtroom, are alerted when the "other mobile device users" enter that location. In another embodiment, the attorney mobile device users check in to register, with the code. As used herein, location is meant to contain a particular mobile device geocoded latitude, and longitude value (GPS).

The system and method may allow for the mobile device users to be identified to each other when they enter a "system waiting area," as defined herein. A system waiting area is a small physical or geospatial area defined by the inventive system and method in reliance upon the Google Maps (or similar) library as soon as the user joins a case index number to communicate with other members. The Google Maps library derives the geolocation and coordinates and relies upon these coordinates to calculate a distance between the persons (i.e., using their mobile devices) using the inventive method. Google maps is essentially controlled by the inventive program to fetch coordinates, so that whenever a registered mobile device user moves physically, coordinates changes and the socket.io library is used to update the distance in real-time. Alternatively, GPS and cellular technology may be used by the inventive system and method for such geolocation purposes. In another alternative, the inventive method and system may rely upon Bluetooth™ for communication purposes, but in other embodiments, the inventive system and method do not rely upon Bluetooth™.

In the preferred embodiment for the "find me at court" function, operation, when such mobile device users are proximate each other, physically in the area qualified as the system waiting area (after becoming registered), the mobile devices may be caused to "ping," enabling recognition by the system waiting area members. Alternatively, the mobile device users can just wave to each other once they have registered and have identified each other in a designated system waiting area or communicate with each other using voice over Internet protocol (VoIP), Wi-Fi, cellular technology, Bluetooth™ or similar protocols.

The inventive system and method also enable court personnel to contact attorneys on a particular case without having them present in a courtroom, and without knowing beforehand who the attorney(s) is/are, or what the attorneys' respective mobile device numbers are. Court personnel can simply open the "check-in at court" function of the mobile application (operational on the court personnel mobile device or other computer system in which a portion of the inventive method is operational-see details below herein) and enter an index number for the matter at hand, or index numbers for all the matters scheduled for a day's calendar.

In the "find me at court" embodiment, when each attorney having the application program operational on their mobile device comes near the courthouse, i.e., the court personnel, in reliance upon the application program operational on the court personnel system or mobile device, can "see" attorneys entering the courthouse or court complex boundary as the attorneys arrive. As importantly, the court personnel can immediately electronically contact each of the attorneys at any time by pushing a call button presented on the mobile device by the mobile device application. The attorneys do not have to be in the courtroom because the mobile device applications have a range of up to 3 miles or more. This allows the attorneys to safely wait outside the courthouse or in their cars and come in for an in-person conference when the court is ready for them and calls them to come into a courtroom.

In another embodiment, when court personnel users open the court personnel application and list the day's cases by index number, the attorney users can check-in on their cases remotely without the attorney users entering the geospatial boundary of the courtroom as further described in the check-in at court function herein.

BRIEF DESCRIPTION OF THE DRAWINGS

Further features and advantages of the invention will become apparent from the description of embodiments that follows, with reference to the attached figures, in which:

FIG. 5G presents a representative screen, which is accessible to all users and updated by the inventive system and method using the "check-in at court" function, depicting all of the cases on that day's calendar which are ready for conference and each case's position in line for conference.

DETAILED DESCRIPTION OF THE INVENTION

The following is a detailed description of exemplary embodiments of the invention, which are depicted in the accompanying drawings. The exemplary embodiments are presented in such detail as to clearly communicate the invention and are designed to teach how to make and use these exemplary embodiments to a person of ordinary skill in the art. However, the amount of detail offered is not intended to limit the contemplated variations of the embodiments of the disclosed invention. On the contrary, the inventor intends to cover all modifications, equivalents, and alternatives falling within the spirit and scope of the disclosed invention, as defined by the appended claims.

Figure 1:
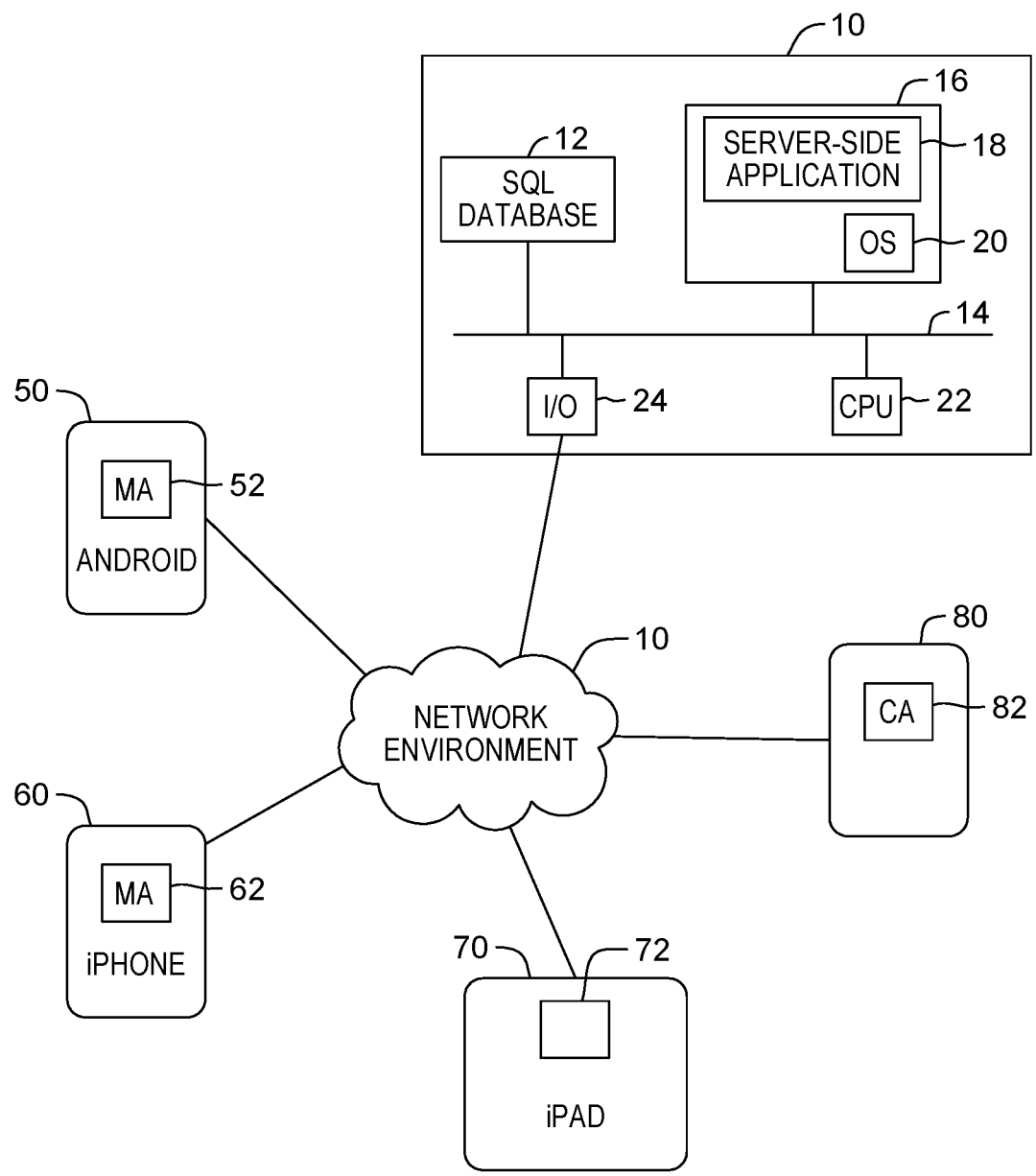
FIG. 1 is a schematic representation of an exemplary system embodiment of the invention.

FIG. 1 depicts a first exemplary embodiment of the inventive system. The system includes a server 10 adapted with an SQL database 12, connected via a bus, such as a PCI bus 14, to a memory 16. Memory 16 includes a server-side application 18 and operating system 20. The server-side application 18 and its operation will be discussed in greater detail below. The server 10 also includes a central processing unit or CPU 22 and an I/O device 24, which connects the server, and therefore, the SQL database 12 and the server-side application 18 when operational in the CPU 22 to the network environment. The network environment 30 comprises the hardware that enables wireless mobile devices to communicate with the operational server-side application 18. The server-side application 18 manages the network environment and data stored in the SQL database 12.

The representative mobile devices include Android mobile device 50, iPhone mobile device 60 and iPad mobile device 70 (e.g., iOS mobile devices), and Microsoft mobile device 85 (e.g., MS devices), and may alternatively include a GPS enabled mobile laptop device; each mobile device includes respective memory stores 52, 62 and 72 within which the computer code (i.e., computer-readable instructions) comprising the mobile device applications (MA) are stored for processing by respective processors within the mobile devices. Preferably, however, the inventive system and method relies up GPS hardware to define geospatial locations at which mobile device applications (in a registered user's mobile device) is relied upon to trigger the inventive operation described herein. For court applications, a court-complex server 80 stores a copy of the court-complex application (CA) in a memory 82. In the case where the system and method rely upon the use of wireless access points, the court-complex server would be hardwired to the wireless access points and to an internet service provider (ISP) to facilitate all communications.

The Mobile Device Application

The mobile device application, according to the invention, is operational in user mobile devices. The mobile device applications identify or associate users that have checked in to the same case (e.g., by index number) and, in the preferred embodiment for the "find me at court" function, identifies or associates users located within a "system waiting area" to communicate with each other by sound and visual identification or by using VoIP (or similar) communications available on the mobile devices. The inventive system and method enable mobile device users to be more productive, enabling them to communicate with one another (or with court personnel) during the time that they would otherwise be wasting, for example, waiting for their judge to call their case, and not knowing which attorneys that mobile device users were there to meet. Use of the inventive system and method allows them to make quick calls to each other, once they are identified.

Any mobile device that supports Android 11 OS (or a later version), iOS x (or a later version), Windows Mobile OS or Google Chrome OS will be able to install and operate the mobile device application. There is no need for wireless access points (WAPs) to facilitate mobile device communications—the application program parts operational in the mobile user devices rely upon cellular data and GPS coordinates. For example, a 100 foot radius about a first mobile device, after the first mobile device has registered in a first waiting room is calculated in reliance upon Google Maps (or similar) coordinates and the distance between the two coordinates of the respective mobile devices. As such, Google Maps and similar applications are relied upon by the inventive system and method to calculate distances between user mobile devices. Preferably, the application program portion running on the mobile device application calculates the distances.

Figure 2A:
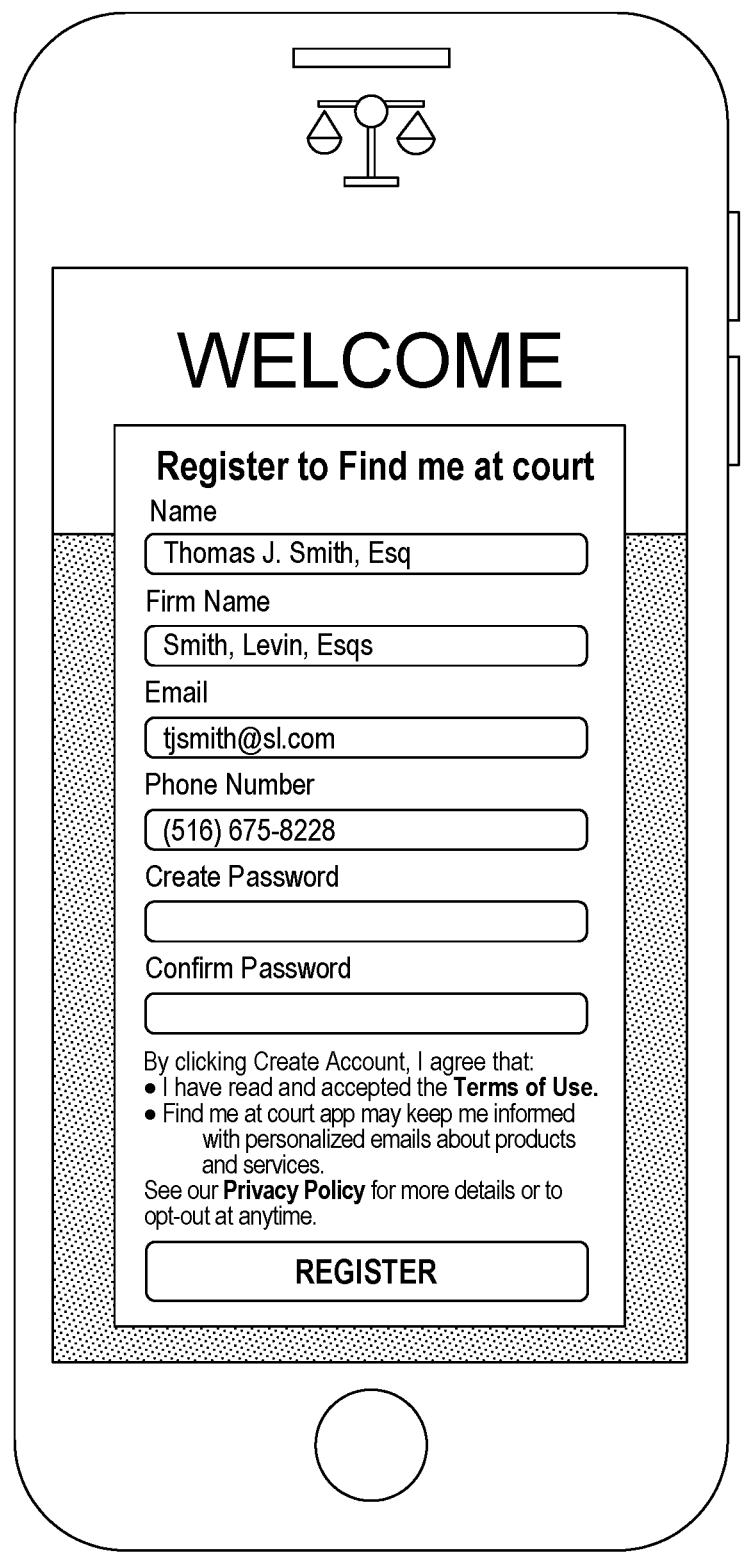
FIG. 2A presents an image of a mobile device with a representative, exemplary user registration screen, for use in the inventive system and method.

As soon as a user installs the mobile device application on his/her mobile device, and opens the mobile device app, the user will be asked to provide registration information. FIG. 2A presents an image of a mobile device with a representative screen enabling user registration. As shown in FIG. 2A, the registering user is required to create a password and provide his/her first and last name, law firm name, email address, and phone number. Also presented to the user is contractual language explaining what the user agrees to by registering when they actuate the REGISTER button, as shown. For that matter, the user interface (UI) that presents the interactive screens during a user mobile device registration process is the mobile device application program (part).

During the registration process, the application program part operating in each user mobile device will store each mobile device user's unique device id, password, user's email id, and user's name and law firm name so that the application program part can identify the users, allow them to make VoIP (or similar) calls once registered. Data preferably is stored on a cloud server, such as Mongo db, but also may be implemented in reliance upon an SQL database, according to need, as shown in FIG. 1. Please note as used herein, "unique device" is used to refer to a unique number that identifies each mobile phone device to differentiate each mobile device user.

Figure 2B:
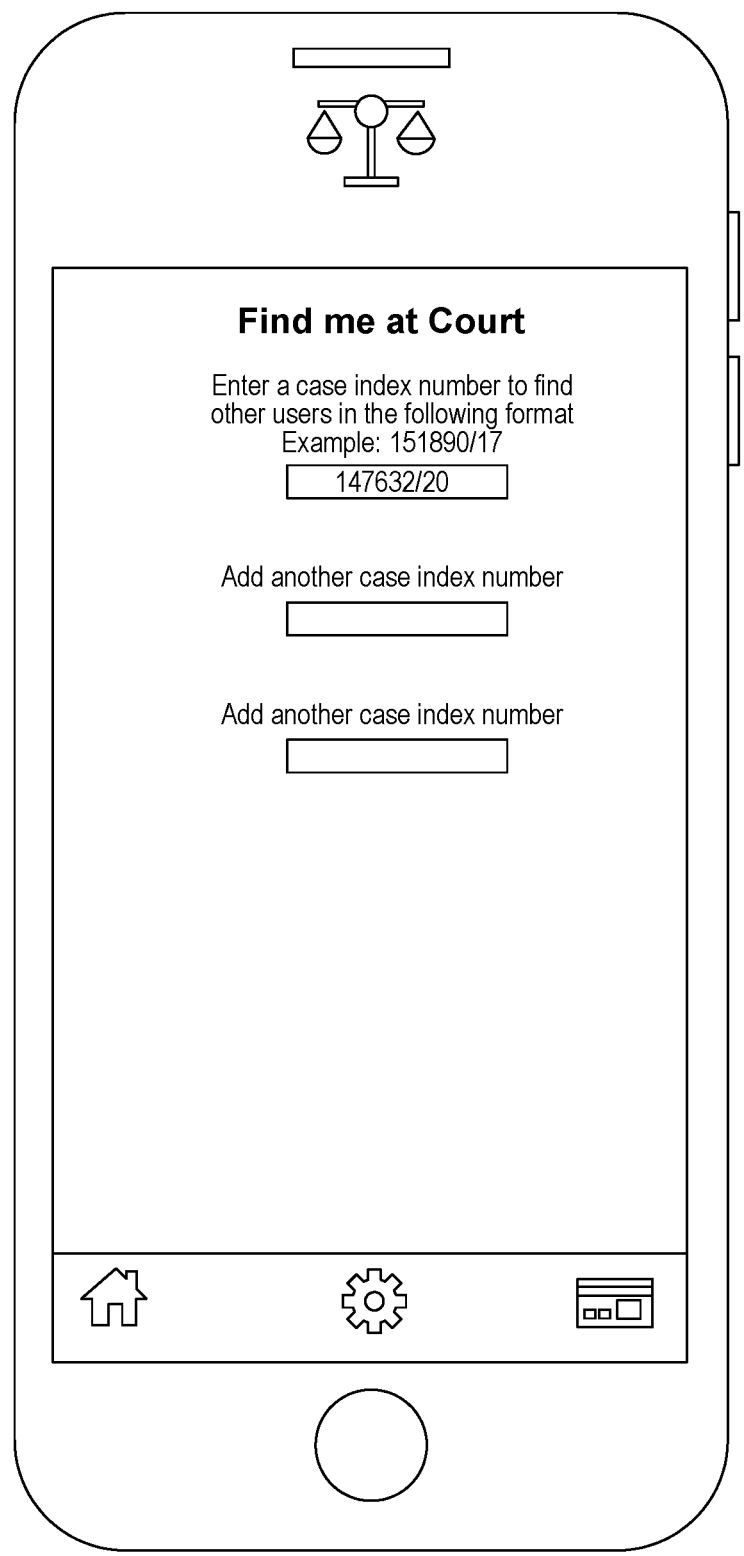
FIG. 2B presents an image of a mobile device with a representative screen by which a registered mobile device user can enter a case index number to "find" other users who have entered and identical case index number.

After registration is complete, the mobile device application may be connected with the server-side application (through the network environment 30) and as needed, a mobile device user will enter a unique case index number or other identifying indicia into a screen location to check in to a case and enter a system waiting area associated with that case. FIG. 2B presents an exemplary screen by which a mobile device user can enter a case number to locate other mobile device users who have entered and identical case index number and "find" them at court. Again, upon entering a particular index or docket number automatically enters the user into a "system waiting area" associated with the index or docket number A temporary window of communication is associated with a case number, and exists only for a limited, predetermined amount of time after two or more registered users open the mobile device application and enter an identical case index number. The system waiting area is included in the inventive system and method in the "find me at court" function for ease of use and to limit inadvertent communication with users in other jurisdictions who, by chance, might enter an identical index number within the window of communication afforded by the mobile device application. That is, the inventive system and method connect only those users located within the system waiting area and to facilitate the use of the "find me at court" function for its preferred purpose of in-person recognition and communication between users in or about a courtroom setting.

Other mobile device users who have first registered, and then entered the same index number are joined to the system waiting area and are enabled to communicate with each other using VOIP, Wi-Fi, or cellular technology (again, for a limited time period). The inventive system may rely upon the Internet to implement VoIP communications, such as via one or more wireless access points (WAPs), Wi-Fi or a cellular technology. In the preferred system, cellular technology may be used as a backup for VoIP or Wi-Fi. Preferably, when additional mobile device users register and enter a particular index number as the aforementioned first mobile device user, certain processes are initiated.

First, the mobile device application parts of all mobile device users in a physical system waiting area will "ping," or otherwise signal, whenever another mobile device user "checks in." The physical system waiting area for the "find me at court" function is defined by the longest radius chosen by any of the users, between from about 100 feet to about 3 miles. Moreover, the additional user(s) may be listed by name, physical system waiting area user number, law firm, etc., as illustrated in the exemplary screen of FIG. 2C. Accordingly, every mobile device user admitted to a physical system waiting area may be able to "see" each other's credentials.

Alternatively, in another embodiment, the system waiting area may not be limited to any distances from a physical location, hereinafter "virtual system waiting area." In the case of a virtual system waiting area, the mobile device application parts of all mobile device users in a virtual system waiting area will "ping," or otherwise signal, whenever another mobile device user checks in.

Figure 2C:
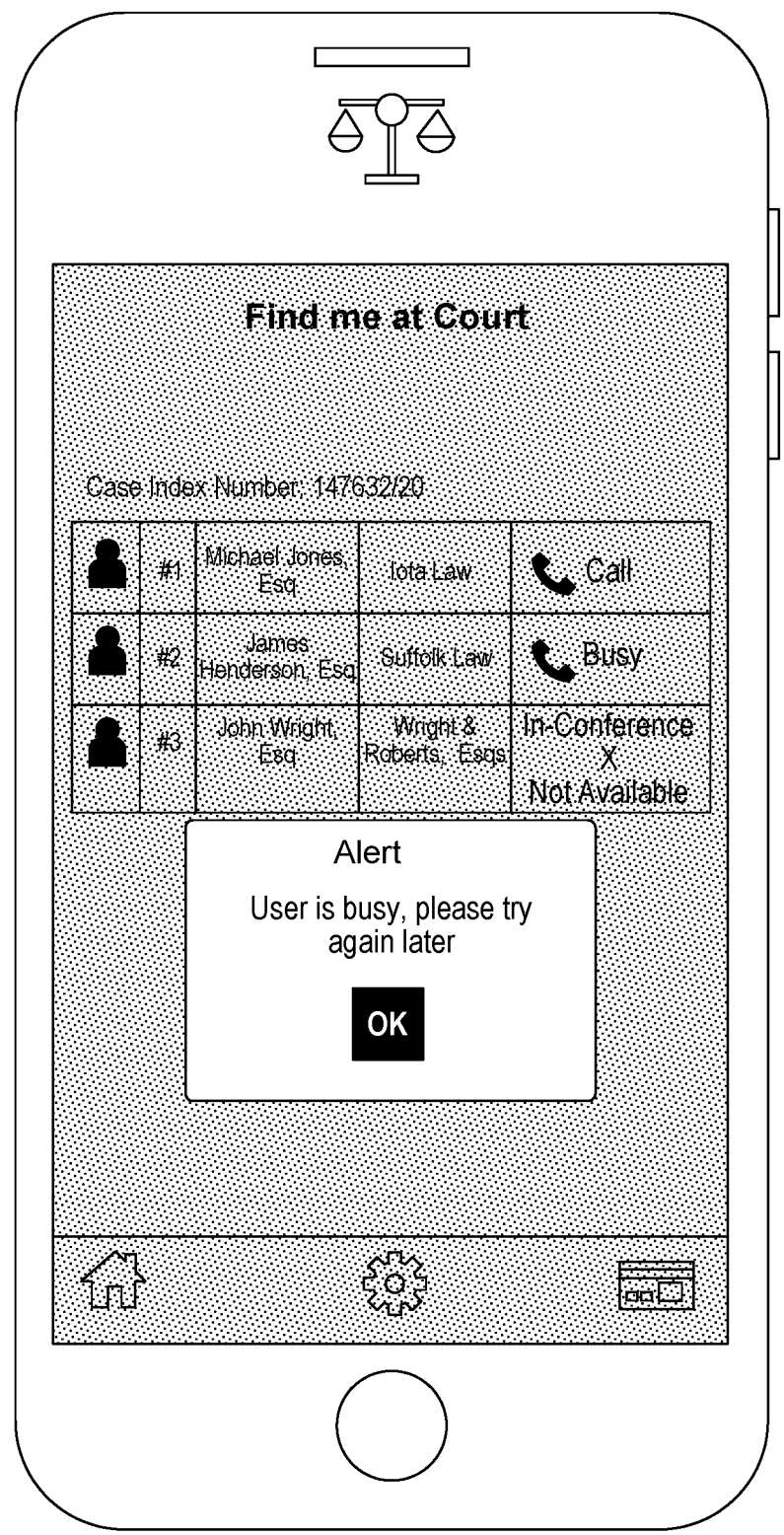
FIG. 2C presents an image of a mobile device with a representative screen which allows a registered mobile device user to communicate with other users who have entered an identical case index number by means of a virtual call button or icon, using voice of Internet protocol (VoIP), and which further provides a "busy" icon to indicate if another such user's VoIP connection is busy and an "in conference-not available" icon if the user selects that setting.
Figure 2D:
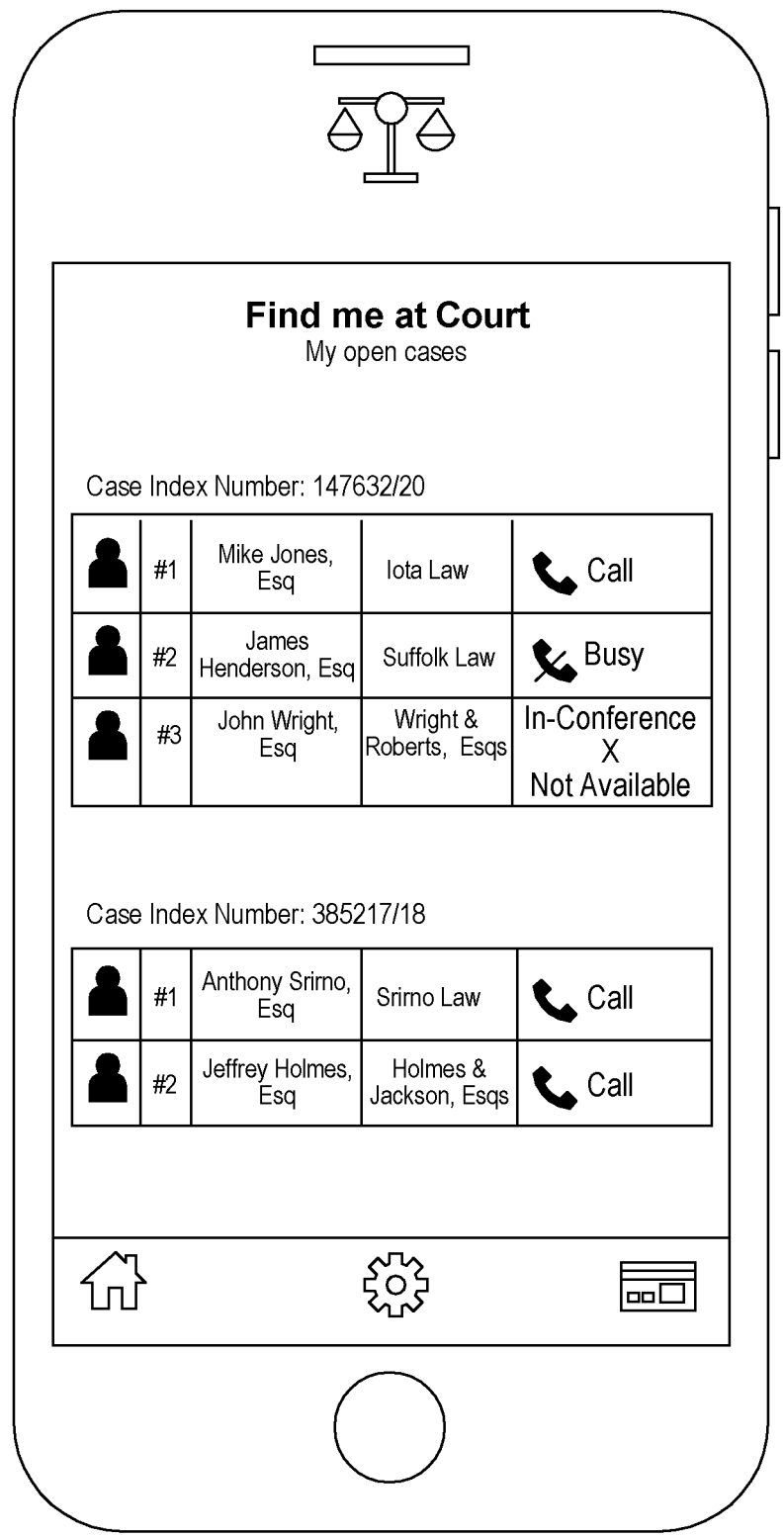
FIG. 2D presents an image of a mobile device with a representative screen depicting a list of the ("open") cases for which an individual attorney user has entered a "find me at court" case index number on that day. The list is accessible to each individual attorney user and is automatically updated by the inventive system, including icons to call other users on that case and to indicate if another user on that case has a busy connection or is in conference and unavailable.

Additionally, a virtual call button, or other calling icon next to the mobile device user's name is activated, so that another mobile device user listed may be called directly using VoIP, in reliance upon Wi-Fi or other radio or cellular technology, the Internet, or Bluetooth™ or similar technology by actuating the call button, as shown in FIGS. 2C and 2D. In this way, the mobile device users may call and speak with each other, for example, to ascertain their respective physical locations, speak or set-up negotiations prior or following the hearing or other event scheduled.

Figure 2E:
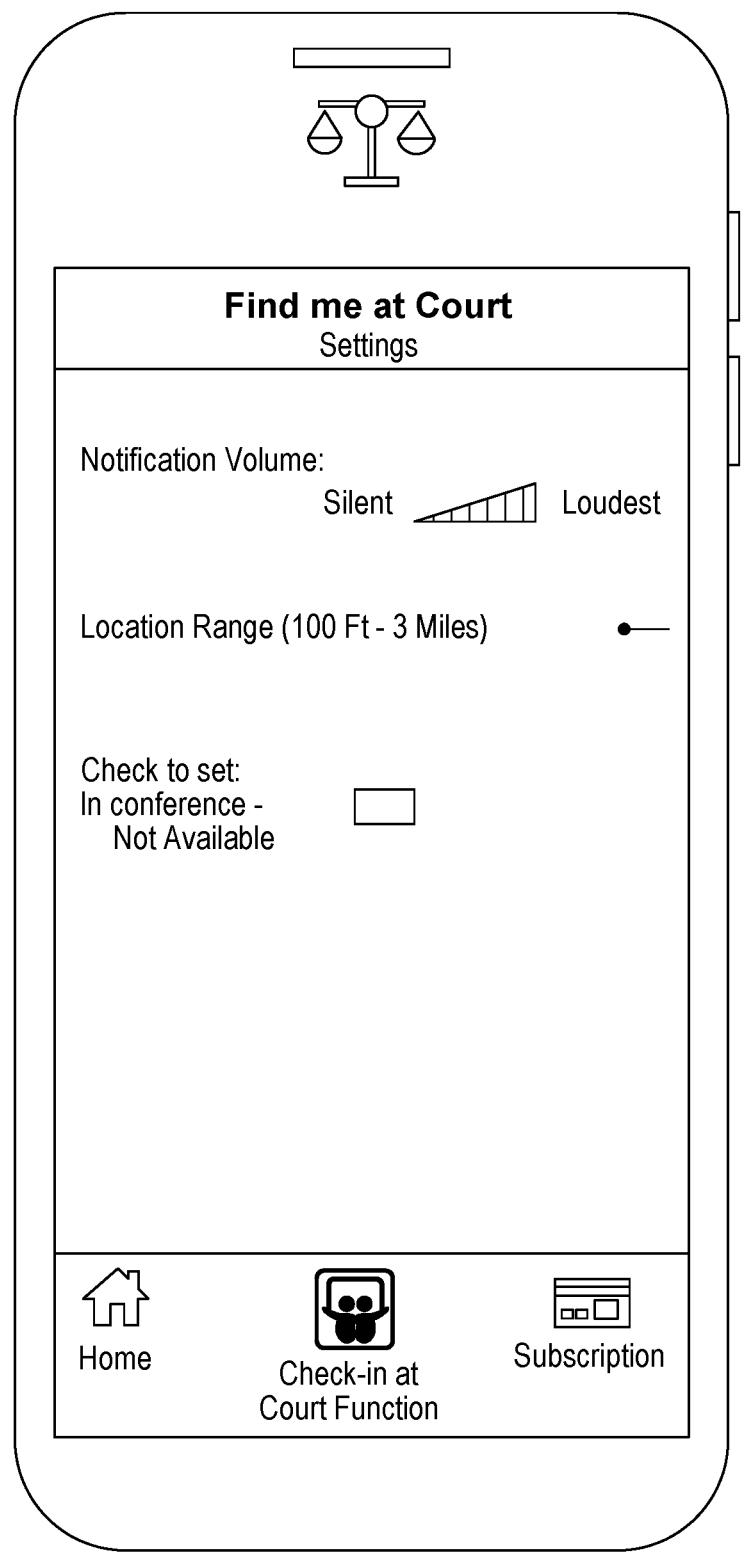
FIG. 2E presents an image of a mobile device with a representative screen depicting a "settings" page which allows attorney users to adjust the location range of the "system waiting area" in the "find me at court" function from 100 feet to 3 miles, adjust the volume of the "ping" and "buzz" sounds that are produced when two users connect and call one another, initiate the "not available" function while a user is engaged in another court conference, access the home and subscription pages and allows users to access the "check-in at court" function of the inventive system.
Figure 2F:
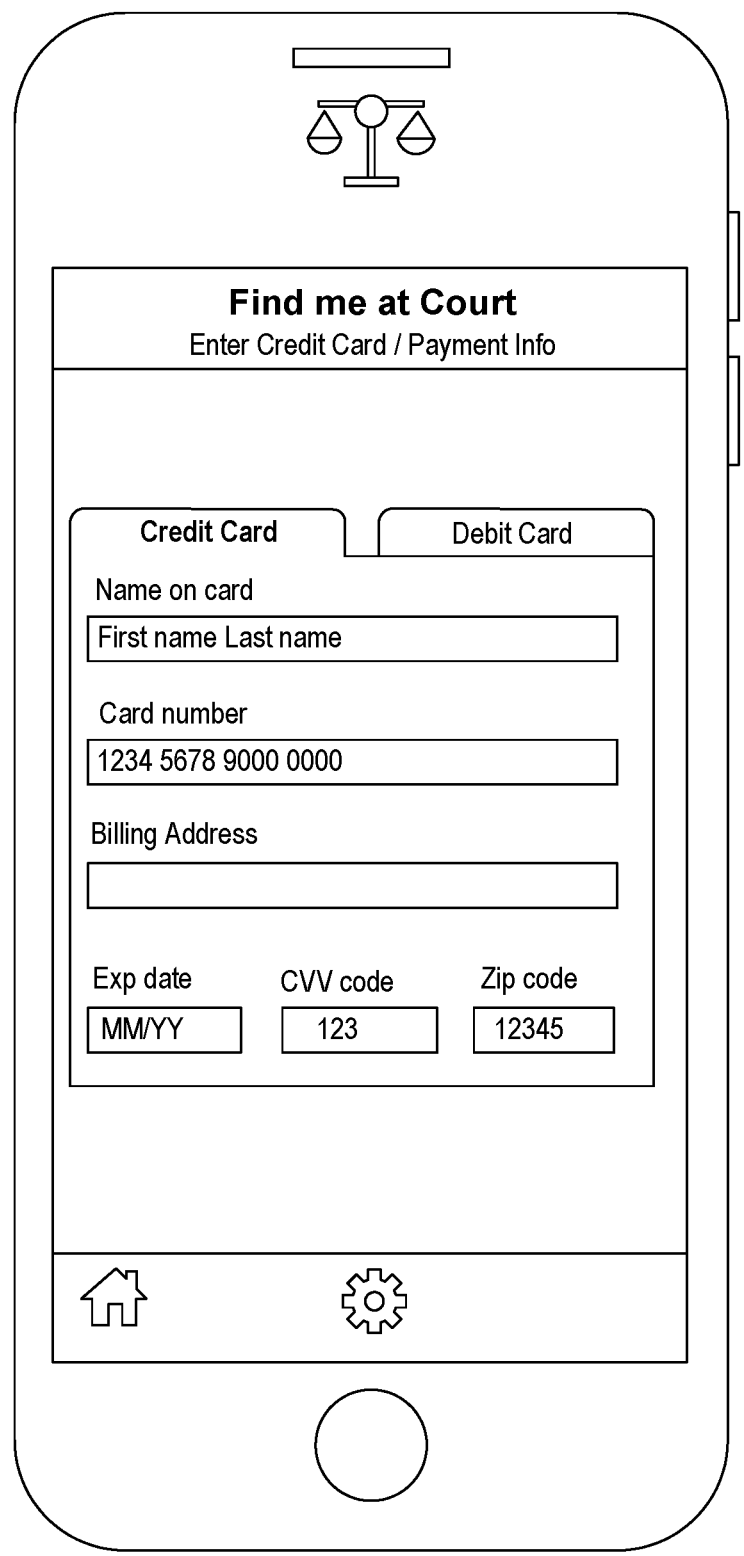
FIG. 2F presents an image of a mobile device depicting a representative screen depicting a user profile record with the user's personal information, including credit card and law firm ID, and optional switches.

The exemplary screen of FIG. 2E depicts a "settings" page presented to the mobile device User. The settings page allows the user to adjust the range of the system waiting area, the volume of the "ping" and "buzz" notifications, to access the home and subscription pages, to initiate the "not available" function and to access the "check-in at court" function.

VoIP, cellular or the like calls are preferably implemented with the help of the Twilio library. Please note that the temporary window of communication created by two or more users entering an identical case index number is preferably active for 4 hours. However, the inventive system and method are configurable so that court administrators can extend the temporary window of communication as necessary and close the temporary window of communication on each individual case as the conference for that case is completed.

Figure 3:
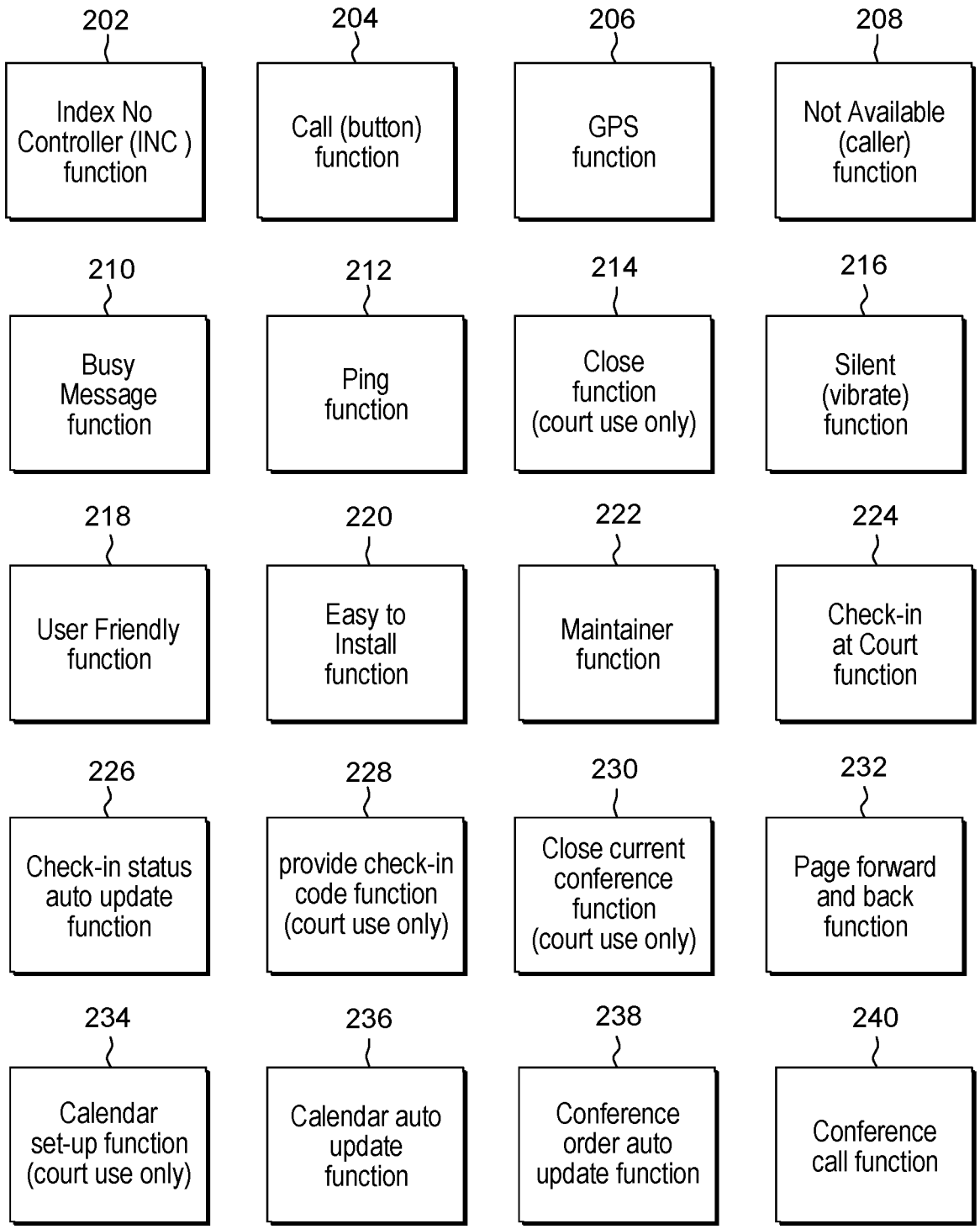
FIG. 3 depicts representative functions that may be implemented by the inventive system and method in the court personnel user application and the mobile device application.

FIG. 3 depicts a number of functions that may be implemented by the inventive system and method. The index number controller (INC) function 202, stores index or docket numbers or similar identifying indicia entered by mobile device users. The INC function 202 may also activate the core logic to find other attorneys with same index or docket number or other identifying indicia. The index or docket numbers may preferably be stored with a date and time stamp. Each index number may be maintained active for a few hours or more. That is, when an attorney user arrives at court and does not know who else is on the same case, but is expecting to meet with other users, the attorney user merely opens the mobile application, enters confirmation/case/index number.

When using the "find me at court" function, the first attorney user to enter the case number for the case scheduled for that day, causes the time window to open and creates the system waiting area. In the preferred embodiment, as soon as other attorney user(s) enter the same number, later in time, and has entered the system waiting area, allowing the mobile device users to identify one another by sound and visual recognition provided by the mobile device application and are then able to communicate with one another, in person, or by using the VoIP feature.

A call button function 204 provides for the call function of mobile device user(s) who have registered and entered a system waiting area associated with an index number. As shown in FIG. 2D, the call button is available next to each index number. The mobile application on each user's phone will show the added user, identified as user #1, user #2, user #3, etc. Preferably, the call button is auto enabled as soon as there is more than one person with same index number, and they are within the defined range. The called "response" may be implemented as either a buzz ringtone, or any other caller ringtone sound as per audio/sound file availability and technical limitations.

A GPS Function 206 concerns connecting users. That is, mobile devices users are required to enable their location services on their mobile devices. Once activated, mobile user application will keep the location services enabled for next time application use. Using GPS, the mobile device application may enable adding users to the same index number list as they come in a default (for example, 100 ft) radius of each other. As soon as there are more than two users within the selected range with the same index number or other identifying indicia, the mobile device application will produce the "ping" or other selected signal or sound. Mobile device users may have the option to extend the range up to three miles or more to search and connect with available attorneys with the same index number, in reliance upon the Google Maps (or similar) library. Preferably, the "find me at court" function of the inventive system and method rely upon global positioning system (GPS) technology to determine which mobile device users who have entered the same code (or group number, for example) are within the system waiting area.

An "in conference-not available" (caller) function 208 displays an icon on the caller user's mobile device, when a called user is not available at the time of a call, next to that called user's name as shown in FIGS. 2C and 2D. Also, a "busy" function 210 activates a screen on the caller user's mobile device when the callee is busy with another call. So, if there are more than two users, the call function will work as described here, but if the first and second users are on a call, a 3rd mobile device user would be unable to reach the first or second user until a call between them is completed. At that point, the 3rd user may be able to connect with the first or second users.

In one embodiment, a conference call mode also is available for users, whereby all users who have entered the same code number may call and connect simultaneously with all other users who have entered the same code number within the temporary window of communication afforded by the mobile device application. A conference call function 240 provides a capability of checked-in users to conduct conference calls.

Preferably, in the "check-in at court" function, only the court user will be able to initiate the conference call for the actual conference with the court. A Ping (or similar) function 212 controls the mobile user device to produce a ping sound, or similar signal, every time a new user joins by entering into the radius set by other attorneys having the same index number by entering into the system waiting area or the radius of the system waiting area, set by other attorneys. The "ping" or any other sound or signal is implemented as per audio/sound file availability and technical limitations of the device, depending on the mobile device protocol (Google OS, MS or iOS). A "close" function is for court personnel use only, which allows court users to close an index number or virtual system waiting area.

A Silent (or Vibrate) function 216 may be activated to maintain the mobile device in silent mode. That is, when the silent feature is activated, the mobile device user will still be able to see that a new user has joined an index number associated system waiting area, and his/her user #, but his phone will not produce an audible signal (ping). The user may also be able to receive calls, but the phone will vibrate, not ring. A user-friendly function 218 enables the mobile device application to be simple and easy-to-use, including all functions to achieve a quick and efficient administration.

An easy to install function 220 is a UI/UX concept relied upon by the inventive system and method while drawing application program objects. An Easy to Install function 220 may enable the mobile device application to be easy to install, simple to configure so as to be a simple, efficient out-of-the-box solution for attorneys. The Easy to Install function 220 is used by simply clicking on an application icon to effect installation of the application program (part). A Maintainer function 222 enables easy maintenance of the entire system, i.e., the server-side and mobile device apps. The Maintainer function 222 is an administrative section of the application program that manages its users and data.

Check-In at Court Function

The "check-in at court" function 224 may require preloaded data from a courthouse, or court complex computer server, for the court at which the inventive system and method is deployed. This may require operation of the court-complex application on a court personnel computer system or device. The court-complex application allows court personnel to manage the court-complex docket and appearances and communicate directly with attorneys (by the attorneys' mobile devices in which the mobile application program part is operational) who have registered and checked in for a particular case, as well as communicate, where necessary, with a server-side application program part.

The court-complex application may be deployed on a computer server, a desktop computer, laptop computers or even a mobile device by a court administrator personnel using an input device, the court personnel input the day's cases by name and Index No., and parties appearing by an attorney in the case that has the mobile device application operational in his/her mobile device, and registered for a particular case; e.g., Wells Fargo v. Michael Jones-Index No. 345621/19, Appearing Parties: Wells Fargo, Michael Jones, Thomas Smith, Citibank. The court-complex application communicates this data to the server-side application 18 (FIG. 1), which may store the information in the SQL database 12.

Please note that the software or application program part operational on a court-complex computer/server operates differently than the application program part operational at the server 18 and/or the mobile user devices. The software running on the court-complex computers is designed with functions relied upon by court-personnel users and includes code facilitating interaction between the court personnel users and the server-side application and the mobile device applications, for example, by way of respective APIs. The differences between the court-complex application program part and the server-side and mobile device application parts include, for example, that the court-complex application program does not define the parameters for a "system waiting area." Instead, the range of the temporary window of communication afforded by the "check-in at court" function is unlimited to allow users to check-in remotely from any location.

As explained above, the "system waiting area" is created by the application on the server side in response to a user of the "find me at court" function checking in to a particular court case by selecting an index or other serial number and physically entering within the radius defined by the system waiting area. The court-complex application provides screens to the computer device or devices of the court-complex personnel tasked with managing the operational system, enabling entry of pertinent court cases listed, such as shown in FIG. 4C so that the related parties may attach to their case number, as explained herein.

Figure 4A:
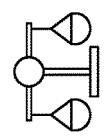
FIG. 4A depicts a representative screen presented on a display device of a court-complex computer or computer server to enable court personnel users to register to use the "check-in at court" function of the inventive system.
Figure 4B:
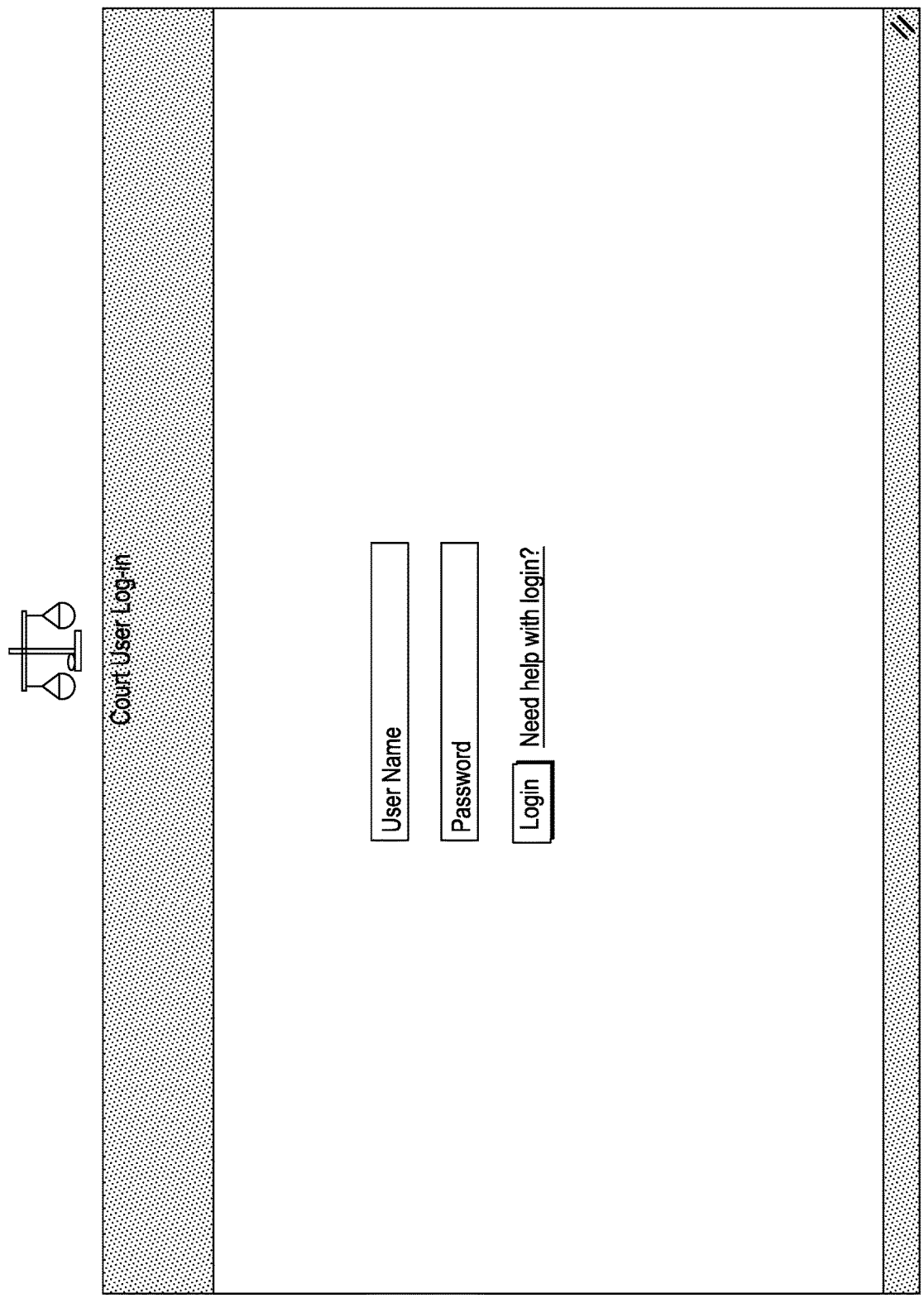
FIG. 4B depicts a representative screen presented on a display device of a court complex user who has registered to use the "check-in at court" function in order to log into the "check-in" at court function.
Figure 4C:
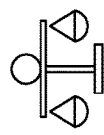
FIG. 4C depicts a representative screen by which a court user may post the daily conference calendar accessible to all users on the "check-in at court" function, including the judge's name, court name, index number, calendar number and necessary parties for each case conference, attorneys, law firm names and the parties that each attorney represents.

FIG. 4B, is a representative screen presented on a display device of a court-complex computer (e.g., server) to enable court personnel users to log in, where once logged in, the court personnel user is presented with an interface, such as depicted in FIG. 4C.

Figure 5A:
FIG. 5A depicts a representative attorney check-in screen using the "check-in at court" function.

Mobile device users may initiate the "check-in at court" function for a particular case set up by the court-complex personnel by pushing a button or other icon on a screen provided by the mobile device application, such as shown in FIG. 2E. For that matter, an attorney/mobile device user may then be presented with another screen, such as that depicted in FIG. 5A, allowing him/her to enter an index number or other identifying indicia (e.g., Index No. 345621/19). Once submitted, the mobile device application provides the entered data to the server-side application. In response, the server-side application processes the data in the SQL database and automatically generates and transmits a text or email (or both) to the mobile device application with a unique (e.g., 5 digit) check-in code, such as a one-time password (OTP). The inventive system and method provide a check-in code function 228, which allows court users only to provide a check-in code associated with a case. Preferably, the system and method operates with the support of a third-party OTP provider, as known to the person of ordinary skill in the art. This code "appears" on the Attorney/mobile device to come from the Court. For example, the server-side application sends a text or email to the mobile device user that may read as follows: Wells Fargo v. Michael Jones-Index No. 345621/19 Check-in Code—45123.

Figure 5B:
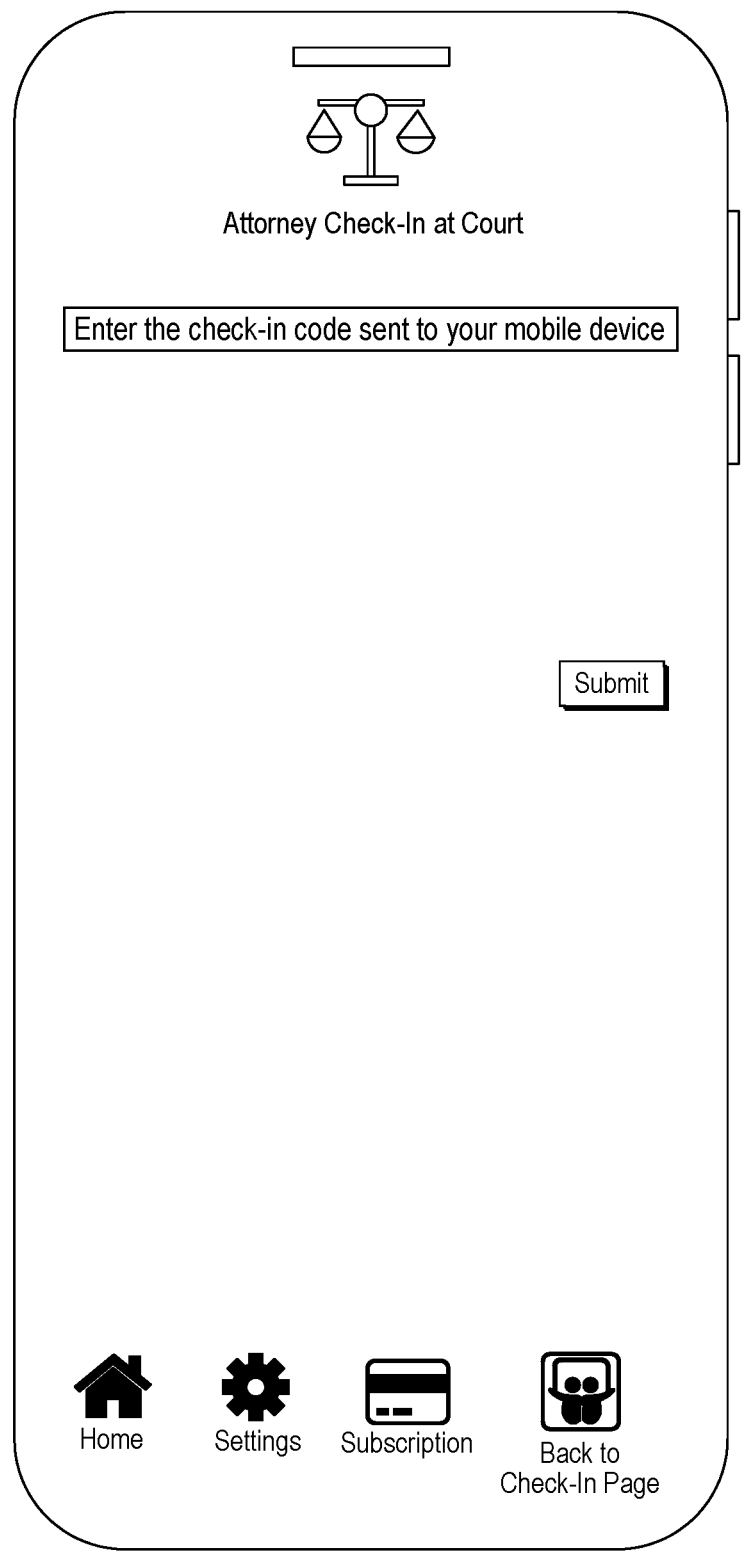
FIG. 5B presents a representative screen of a court user's request to an attorney to enter a check-in code provided by the court user using the "check-in at court" function.
Figure 5C:
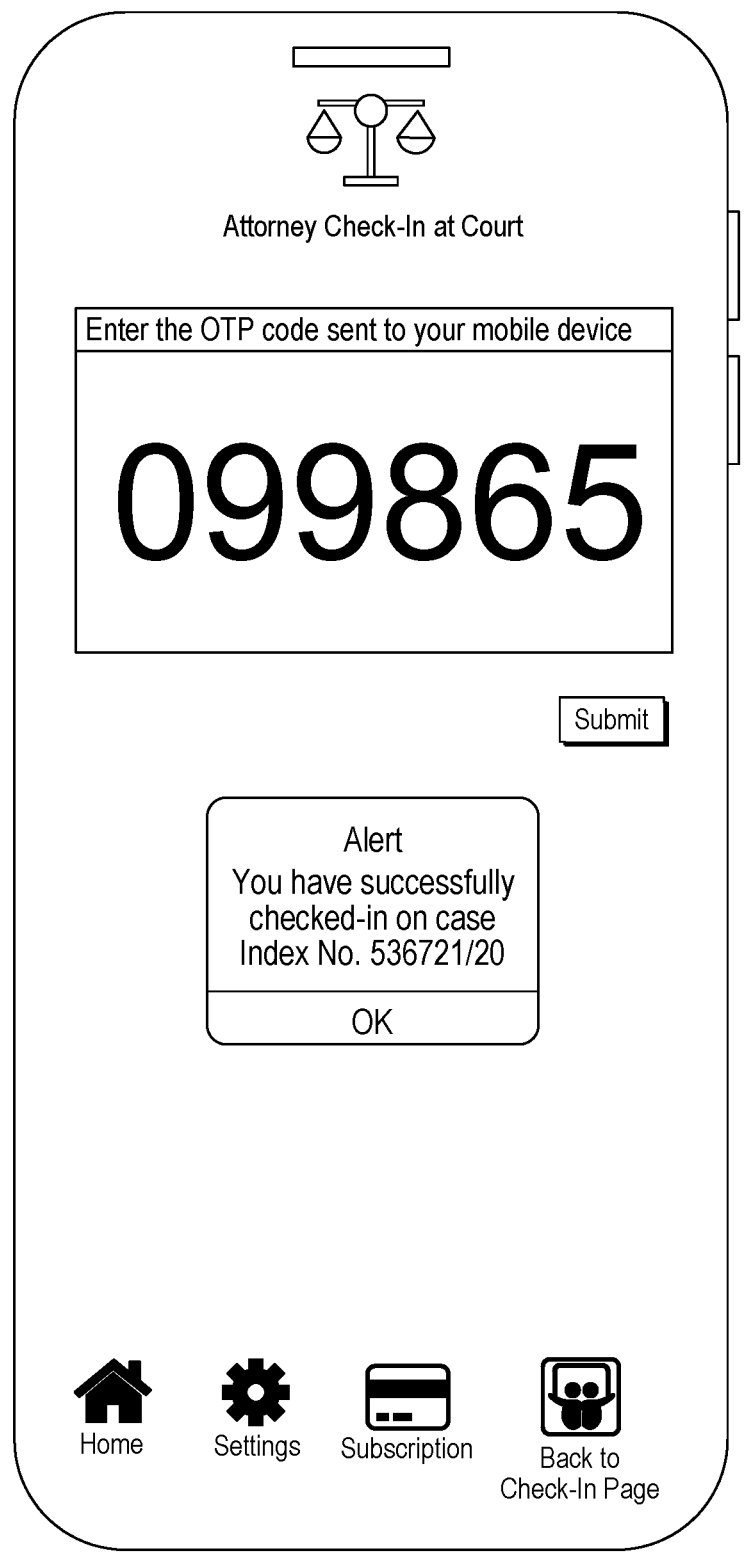
FIG. 5C presents a representative screen of an attorney notification by the court users of a successful check-in using the "check-in at court" function.

The attorney/mobile device user then enters a check-in code when prompted, as shown in FIG. 5B (e.g., 099865), which is shown in FIG. 5C. The check-in/OTP code (e.g., 099865) is transmitted to the server-side application, is processed and the court-complex application is notified that the attorney has checked in. The attorney user's name, firm name and the party he/she represents may also be shown to the Court personnel user/personnel. Similarly, the attorney user may automatically receive a text or email notification acknowledging that he/she has checked in.

Figure 5D:
FIG. 5D presents a representative screen depicting the daily conference calendar posted by the court user in FIG. 4C, which is accessible to all users, and which is updated by the inventive system and method using the "check-in at court" function, to indicate the check-in status of all parties and the readiness status of each case for conference.

FIG. 5D is a representative screen presented to all users that depicts the daily calendar posted by a court user, the check-in status of all parties and the readiness for conference status of each case, on a case by case basis. For that matter, a check-in status auto update function 226 maintains the status of the check-ins to a case number. The court-complex application and the attorney/mobile device application are notified by the server-side application whenever another attorney user mobile device checks-in on that case. When all represented parties have checked-in, the court complex application program part may be notified, e.g. "All parties are checked-in on Index No. 345621/20" and the court complex application may automatically send a text or email or notification through the mobile device application to all attorney users on that case that the case is ready for conference. The notification may also advise the attorneys of their place in line for a conference. e.g., "All parties have checked in. This case is 2' in line for conference with the court."

Figure 5E:
FIG. 5E presents a representative screen which is accessible to each individual attorney user and updated by the inventive system and method using the "check-in at court" function, listing that individual attorney's cases for that day and the check-in status of all of the other parties on those cases.

FIG. 5E presents a representative screen which is accessible to each individual attorney user and which is automatically updated by the inventive system and method using the "check-in at court" function. The screen lists that individual attorney's cases for that day and the check-in status of all of the other parties on those cases.

Figure 5F:
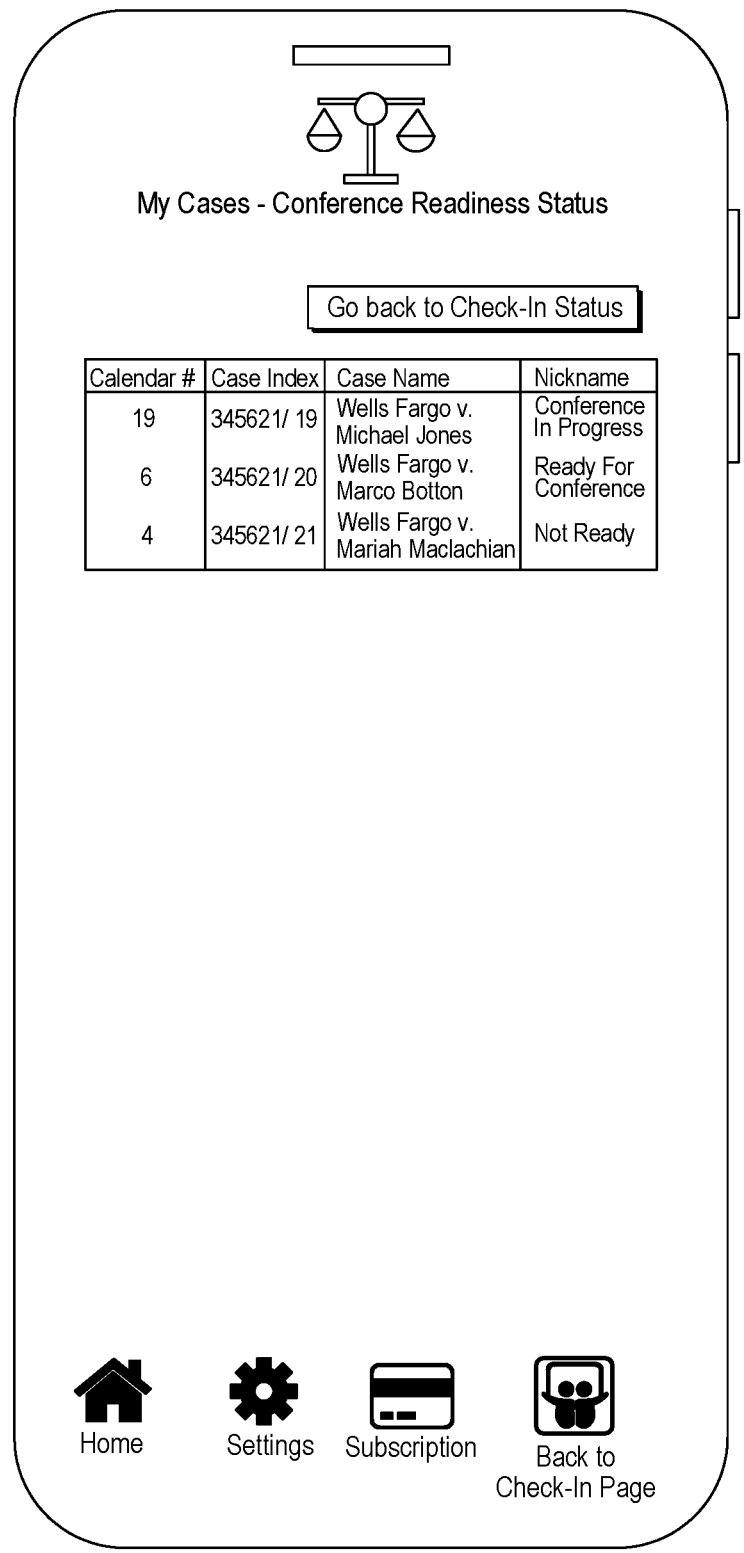
FIG. 5F presents a representative screen, which is accessible to each individual attorney user and updated by the inventive system and method using the "check-in at court" function, listing that individual attorneys checked-in cases for that day and the conference readiness status of each of those cases.

FIG. 5F presents a representative screen, which is accessible to each individual attorney user, and which is automatically updated by the inventive system and method using the "check-in at court" function. The screen lists that individual attorney's checked-in cases for that day and the conference readiness status of each of those cases.

FIG. 5G presents a representative screen, which is accessible to all users and updated by the inventive system and method using the "check-in at court" function, depicting all of the cases on that day's calendar, which are ready for conference and each case's position in line for conference. The inventive system and method maintain synchronization of the application program part operational at the server with each attorney user's status as soon as attorney users are checked-in and as soon as a conference is completed. This helps everyone to be aware of a case's progress in the real time. A close current correspondence function 230, allows court users only to close current conferences (FIG. 3). A page forward and back function 232 provides for users to page forward and backwards. A calendar setup function 234 allows for court users only to set up a court calendar, associate cases, etc. A calendar automatic update function 236 automatically updates and synchronizes, Whenever a conference ahead of the conference for index No. 345621/19 is completed, the court complex application may close that case index number out. The court complex or court complex application publishes all changes (e.g., status) to the server-side application, at server 18 (and SQL database) and pushes all changes to the mobile device applications. In this way, the attorney/mobile device users who are waiting for a conference may be automatically notified through their respective mobile-device applications that their position in line for a conference has changed, e.g., "Index No. 345621/21 is now 2nd in line for a conference with the court." A conference Order automatic update function 238 automatically update each case and communicates the status to mobile device users associated with the order case number, Preferably, once a scheduled conference is completed, the court personnel users will mark that the case conference complete and in doing so, automatically move the "next case" on the calendar/list for which all parties are available one place closer towards a conference with the court. The Court personnel user application part broadcasts or publishes all changes to the application program part operational at the server. The server then pushes same to all mobile device users.

When a court user is ready to conference the case, the server-side application will allow the court personnel user device to make a conference call or a video conference call to all of the attorney users in that case, connecting all parties by VoIP through the case index number. The court personnel user may either request an in-person conference and ask the attorneys to come into chambers, or at that time can hold the conference remotely by conference call or video conference at the court's option.

If the court personnel user prefers in person conferences, the attorney/mobile device users may be expected to be in the immediate vicinity of the courtroom when notified that the conference is being called and the 3-mile range provided by the "find me at court" function will be sufficient. If the court prefers remote conferencing, the "check-in at court" function must be utilized, and the range of the application will be unlimited.

Although the foregoing invention has been described in terms of certain specific embodiments, other embodiments of the invention will be apparent to those of ordinary skill in the art from the disclosure herein. Moreover, the described embodiments have been presented by way of example only and are not intended to limit the scope of the disclosure. Indeed, the novel processes and systems described herein may be embodied in a variety of other forms without departing from the spirit thereof.

What is claimed is:

1. A computer-implemented method for enabling registered mobile device users associated with a common matter to identify each other in a courtroom or other court-complex setting, and to communicate with each other directly using respective mobile devices upon entering a code associated to the common matter, the method comprising the steps of:
   using the mobile device application, registering a mobile device user by inputting the users' name and firm name, if any;
   a server-side application receiving and processing respective users' names and firm names, if any, to effect the users' registrations;
   using the mobile device application, a first registered mobile device user entering a code associated with the common matter;
   the server-side application receiving and processing the code associated with the common matter by the first registered mobile device user, effecting check in by the first registered mobile device user;
   using the mobile application, a second registered user entering the code associated with the common matter entered by the first registered user;
   and
   wherein the server-side application enables the first registered mobile device user, and the second mobile device user associated with the common matter to communicate over a wireless network using voice over Internet Protocol (VoIP), Wi-Fi or cellular telephony.

2. The computer-implemented method of claim 1, wherein upon receiving and processing the code entered by the first registered mobile device user to check in, the server-side application opens a virtual system waiting area for the common matter.

3. The computer-implemented method of claim 1, wherein the mobile device application limits communications between registered mobile device users associated with the common interest that are identifiably located within a defined radius of the courtroom or other court-complex setting associated with the common matter, defining a system waiting area.

4. The computer-implemented method of claim 3, wherein the defined radius of the system waiting area is 100 feet.

5. The computer-implemented method of claim 3, wherein the defined radius of the system waiting area is 3 miles.

6. The computer-implemented method of claim 3, wherein the defined radius of the system waiting area is within a range of between 100 feet and 3 miles.

7. The computer-implemented method of claim 4, wherein the mobile device application enables a user of a registered mobile device application to expand the defined radius from 100 ft to 3 miles.

8. The computer-implemented method of claim 1, wherein the server-side application receives and processes the code and causes an identifiable signal to be emitted from the first registered user's mobile device, or the second registered mobile device user's mobile device, or both.

9. The computer-implemented method of claim 1, wherein the mobile device application limits communication between registered mobile device users associated with the common matter to a predetermined time period.

10. The computer-implemented method of claim 9, wherein predetermined time period is in a range of between 1 to 4 hours.

11. The computer-implemented method of claim 9, wherein the server side application limits communication between registered mobile device users associated with the common matter to a predetermined time period.

12. The computer implemented method of claim 1, wherein the server-side application populates a list of all registered mobile device users who have checked-in by entering the code associated with the common matter and communicates the checked-in mobile device users.

13. The computer-implemented method of claim 1, wherein the mobile device application presents an application programming interface with interactive buttons including an active call button next to each registered user's registration information, where said registered mobile device user is associated with the common matter.

14. The computer-implemented method of claim 1, wherein a court-complex application operational in a courthouse computer device communicates with registered users' mobile devices and the server-side application.

15. The computer-implemented method of claim 14, wherein the court-complex application presents court-complex users with a display screen having virtual call buttons next to each listed registered user name, and wherein the court-complex users can click the virtual call buttons to initiate to VoIP, Wi-Fi, Bluetooth or cellular telephony to call to said listed, registered users associated with a respective one of the virtual buttons.

16. The computer-implemented method of claim 14, wherein the court-complex application enables court-complex users to manage court-related data and interact with registered user mobile device applications.

17. The computer-implemented method of claim 16, wherein the court-complex application enables the court-complex users to control an order in which each common matter associated with a code is scheduled for a conference call.

18. The computer-implemented method of claim 16, further including advising registered register mobile device users associated with the common matter of an order in which each common matter associated with the code is scheduled for the conference call.

19. The computer-implemented method of claim 18, wherein the order is determined by an order in which all registered users listed by the court-complex application on a particular case have checked-in.

20. The computer-implemented method of claim 17, wherein each registered user's common matter, associated with the code, advances one place in the list towards a conference call as the court-complex user inputs an entry indicating that a conference call scheduled ahead of said registered mobile device user's common matter and code has been completed.

21. The computer-implemented method of claim 14, wherein such communication includes providing registered mobile users with a check-in code for common matters.

22. The computer implemented method of claim 21, wherein registered mobile device users input the check-in code to check-in on a common matter with the court complex user.

23. The computer-implemented method of claim 1, further comprising:
each registered mobile device user entering a name of a court, or a name of a judge or referee presiding over a common matter associated with the code, before being able to communicate with other registered mobile device users via VoIP telephony, cellular telephony, or both to avoid inadvertent VoIP contact with unintended mobile device users.

24. A computer-implemented method for enabling mobile device users that have registered to use the method, and that have a common interest identified with an associated confirmation or identity number, to identify and communicate with one another for a limited period of time sufficient to achieve a purpose of the common interest, the method comprising the steps of:
using a mobile device application, mobile device users inputting registration information including each registering mobile device user's name or other identifying indicia;
a server-side application receiving and processing the each registering mobile device user's registration information, and maintaining a list of registered mobile device users;
using the mobile device application, a first registered mobile device user of the list of registered mobile device users inputting a confirmation or identity number associated with a common interest;
using the mobile device application, a second registered mobile device user of the list of registered mobile device users inputting the confirmation or identity number associated with the common interest, input by the first registered mobile user; and
wherein the server-side application associating the mobile device users that have input the confirmation or identify number associated with the common interest enables such mobile device users to identify and communicate with one another over a wireless network using voice over Internet Protocol (VoIP) telephony, cellular telephony, or both, for the limited period of time that is sufficient to achieve the purpose of the common interest.

25. The computer-implemented method of claim 22, wherein upon the first and the second registered mobile device user inputting the identical confirmation or identity number associated with the common interest, the server-side application causes an identifiable signal to be emitted from the first and the second registered user's mobile device.

26. The computer-implemented method of claim 25, wherein the identifiable signal is an audible sound, visual signal or physical signal.

27. A non-transient computer readable medium containing program instructions for causing a computer processing the program instructions to implement the method of claim 1.

* * * * *